United States Patent Office 2,745,621
Patented May 15, 1956

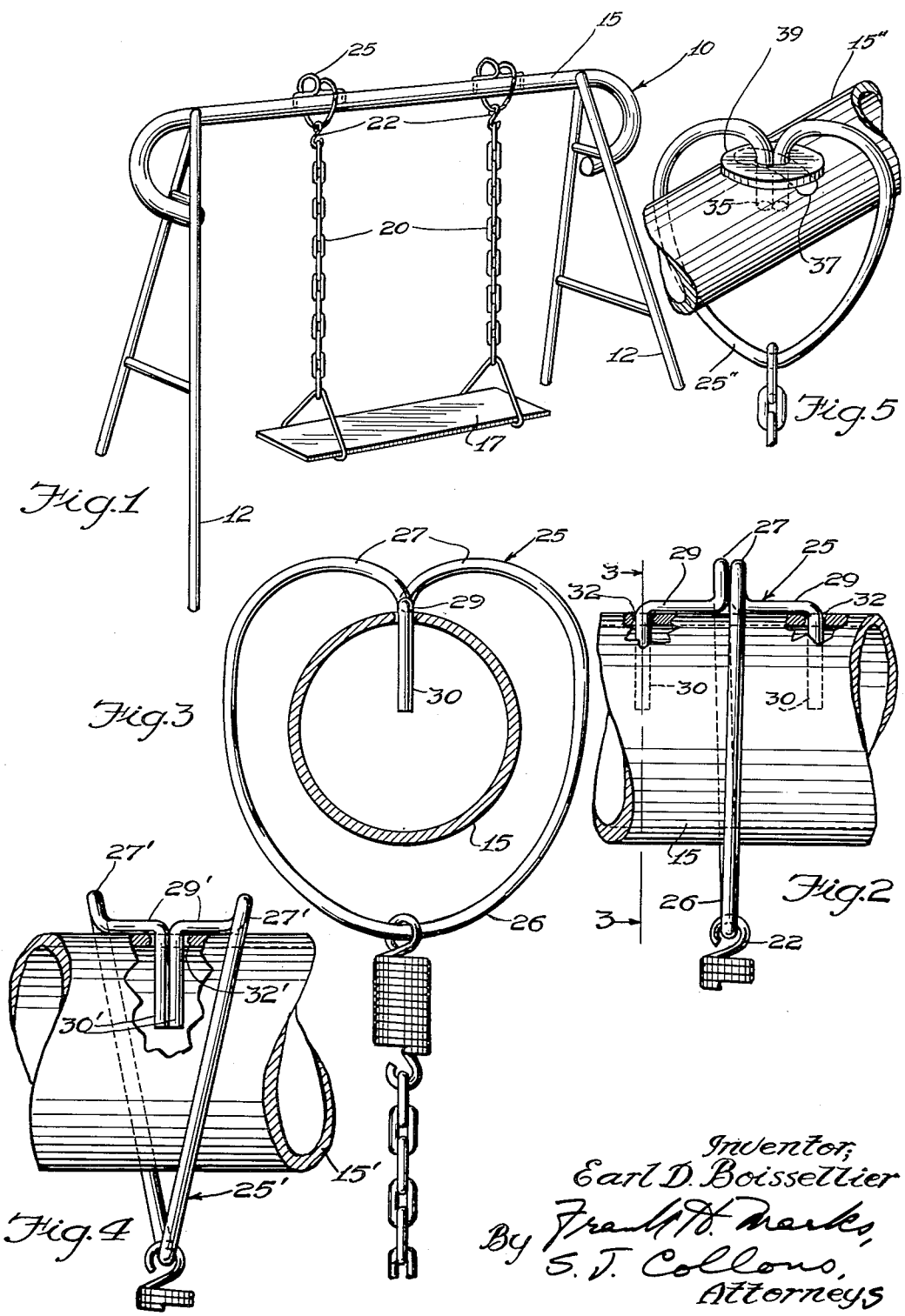

2,745,621

SWING SUSPENSION DEVICE

Earl D. Boisselier, Glen Ellyn, Ill., assignor to Sears, Roebuck and Co., Chicago, Ill., a corporation of New York Application August 5, 1950, Serial No. 177,944

5 Claims. (Cl. 248—340)

My invention relates to children's play swings and is more especially concerned with new and improved bearings and supporting means for the same.

Articles of this character are ordinarily subjected to rough usage as they are used by small children with an abundance of energy. The swings are not only subjected to balanced rocking or swinging motion but are frequently unevenly loaded as by having one or two children in the middle and a child standing on one side thereof. Swinging movement under such unevenly balanced conditions subjects the bearings to great strain.

It is accordingly one of my principal objects to provide a bearing for this type of article which will be exceptionally strong and rugged under the most severe conditions, and one which will be capable of relatively free floating or balanced movement whereby it can adjust itself to a variety of unequal strains.

Another feature of my invention is that my improved bearing will be completely safe for small children under all conditions. As is well known, small children like to climb, and this is particularly true in connection with the trestles used for supporting swings. They also are inquisitive and like to insert their fingers into any small openings in which the members are admissible. An important feature of my invention is that my improved bearings provide ample space in which small fingers and hands may be inserted without any risk of injury even while the swing may be in violent use; there are no small openings in my improved bearings into which finger entry is possible.

Among other advantages of my invention is that it is simple and inexpensive to produce, may be readily shipped in small packages and assembled without tools, consists of a minimum of parts and will remain satisfactory for use over a long period of time even though exposed to the weather, without oiling or other attention.

My invention in general comprises a bearing member formed of drawn metal or the like which is bent into a shape which is roughly heart-shaped, forming a bottom loop which serves as a support for the swing suspension elements, the extremities of the wire being bent to be insertable in an aperture or apertures provided in the top of a horizontal bar of a trestle or the like.

My invention will be best understood by reference to the appended drawings forming a part of this specification and illustrating preferred embodiments of my invention, wherein:

Fig. 1 is a perspective view of a complete swing embodying my invention:

Fig. 2 is an elevational view on an enlarged scale of the bearing member comprising my invention, with associated parts shown fragmentarily;

Fig. 3 is an elevational view taken at right angles to that of Fig. 2 substantially along the line 3—3 thereof;

Fig. 4 is a view similar to Fig. 2 but showing another embodiment of my invention, and Fig. 5 is a fragmentary perspective view showing still another embodiment.

Numeral 10 indicates in general a trestle for supporting a playground swing, comprising triangular struts 12 on the upper extremities of which is mounted a horizontal bar 15. It will be understood that these parts are preferably of metal such as galvanized iron tube or the like, although my invention is not restricted thereto. The bar 15 will, of course, be preferably welded to the apices of the struts 12.

The swing proper will comprise a seat 17 carried by flexible suspension elements 20 which may be ropes, cables, chains, etc., preferably terminating in attaching hooks 22 which engage bearing members indicated generally by the numeral 25.

Referring to Figs. 2 and 3, the bearing members comprising this embodiment of my invention are formed of wire of sufficient gauge and composition to provide the necessary strength. It is preferably metal of low resiliency, e. g., low carbon steel or the like, and may be cast or drawn. The wire is bent to provide a loop portion 26 which engages the hook members 22, the upper portion of the bearing wire being bent to form a pair of lobe portions 27, 27 so that in elevational profile, as seen in Fig. 3, the bearing member 25 is roughly heart-shaped. The wire forming the bearing is bent approximately at right angles from the lobe portions 27 in opposite directions to form approximately horizontal shoulder portions 29, 29, the terminal portions of the wire beings thence bent again at right angles to form vertically extending pintles 30, 30.

The upper portion of the horizontal bar 15 is bored to provide a pair of spaced apertures 32, 32 through which extend the pintles 30, 30. As seen best in Figs. 2 and 3, when the swing is mounted on the supporting means, the pintles 30, 30 extend through the apertures 32, 32 for a substantial distance so that, despite the most violent action on the swing, the bearing members 25 cannot become disengaged. The apertures 32 being only slightly larger than the diameter of the wire forming the bearings will permit limited rocking movement of the bearing.

It will be seen that the assembly of the parts will be of the utmost simplicity it merely being necessary to attach the hooks 22 to the bearing members 25 and insert the terminal portions 30 of the bearings in the apertures 32.

Referring to Fig. 4, it will be noted that in this modification of my invention the bearing 25' is again heart-shaped and carried by a horizontal bar 15'. In this case, however, only one aperture 32' is bored in the bar and the shoulder portions 29' of the bearing 25', instead of extending away from each other as in the former embodiment (Fig. 2), in this case extend toward each other so that the terminal pintle portions 30' are adjacent each other instead of being spaced from each other. Nevertheless, the action of this embodiment will be substantially similar to that of the other.

In the embodiment of Fig. 5, the heart-shaped wire member 25" has its pintle extremities 35 extending through a transverse slot 37 in the tube 15". A perforated washer 39 of hard metal such as stainless steel may be provided over the slot 37.

In this form, as strain is applied to the bearing, the member 25" may rock back and forth in slot 37, permitting free movement secure against disconnection. The washer in this case provides of a bearing surface of slight area against the tube and is thus of low resistance.

Various other changes coming within the scope of my invention may suggest themselves to those skilled in the art and, hence, I do not wish to be limited except to the extent indicated in the appended claims.

I claim:

1. Swing suspension devices of the character described, comprising in combination a tubular horizontal support having a pair of spaced apertures in the upper portion thereof, and a bearing member comprising a continuous loop-form tenuous element encircling said support, said bearing member having terminal portions extending vertically through said apertures and having portions adjoining said terminal portions bent at substantially right angles thereto and engaging the upper face of said support.

2. A combination as in claim 1 wherein the bearing member is retained on the support entirely through engagement of its terminal portions in said apertures.

3. A combination as defined in claim 1 wherein the portions adjoining the terminal portions are disposed substantially horizontally in line with each other and engage the upper surface of said bar and extend at right angles to the major plane of the bearing member of which they form a part.

4. Swing suspension devices of the character described, comprising in combination a tubular horizontal support having at least one aperture in the upper portion thereof, and a bearing member comprising a continuous loop-form tenuous element encircling said support, said bearing member having inwardly directed terminal portions extending into said support with at least one of said terminal portions extending vertically through said aperture and having portions adjoining said terminal portions at an angle with respect thereto and bearing upon said support, said bearing member being laterally movable with respect to said horizontal support except for said terminal portions whereby said portions adjoining said terminal portions entirely support said bearing member.

5. A combination as recited in claim 4 in which said support has a single aperture in the upper portion thereof, said aperture being elongated transversely of the axis of said support, both the terminal portions of said bearing member extending vertically through said single aperture.

References Cited in the file of this patent

UNITED STATES PATENTS

| | | |
|---|---|---|
| 303,961 | Wright | Aug. 19, 1884 |
| 904,140 | Miller | Nov. 17, 1908 |
| 1,345,252 | Rubin | June 29, 1920 |
| 1,445,372 | Wagner | Feb. 13, 1923 |
| 1,476,038 | Birch | Dec. 4, 1923 |
| 1,889,077 | Russell | Nov. 29, 1932 |
| 2,297,877 | De Bruin | Oct. 6, 1942 |
| 2,325,456 | Williams | July 27, 1943 |
| 2,474,718 | Bender | June 28, 1949 |